United States Patent
Steadman et al.

(10) Patent No.: US 8,770,779 B2
(45) Date of Patent: Jul. 8, 2014

(54) SMALL APERTURE RECESSED WALL WASH DOWNLIGHT

(75) Inventors: Connie A. Steadman, Taylors, SC (US); Shawn A. Wilcox, Gray Court, SC (US)

(73) Assignee: Hubbell Incorporated, Shelton, CT (US)

( * ) Notice: Subject to any disclaimer, the term of this patent is extended or adjusted under 35 U.S.C. 154(b) by 67 days.

(21) Appl. No.: 13/537,466

(22) Filed: Jun. 29, 2012

(65) Prior Publication Data

US 2014/0003039 A1 Jan. 2, 2014

(51) Int. Cl.
*F21V 21/04* (2006.01)
*F21S 8/02* (2006.01)
*G02B 6/02* (2006.01)

(52) U.S. Cl.
CPC . *F21S 8/02* (2013.01); *F21V 21/04* (2013.01); *G02B 6/02* (2013.01)
USPC .......................... 362/147; 362/364; 362/551

(58) Field of Classification Search
CPC .... F21S 8/02; F21Y 2103/02; F21Y 2101/02; F21V 21/04; G02B 6/0006; G02B 6/00; F21K 9/00; F21K 9/52
USPC ................... 362/147, 148, 364, 551
See application file for complete search history.

(56) References Cited

U.S. PATENT DOCUMENTS

| | | | |
|---|---|---|---|
| 3,643,089 A | * | 2/1972 | Marantz ................. 362/217.02 |
| 4,623,956 A | | 11/1986 | Conti |
| 5,303,125 A | | 4/1994 | Miller |
| 5,384,881 A | | 1/1995 | Miller |
| 5,562,343 A | | 10/1996 | Chan et al. |
| 6,095,669 A | | 8/2000 | Cho |
| RE36,908 E | | 10/2000 | Ling |
| 6,234,640 B1 | | 5/2001 | Belfer |
| 6,238,065 B1 | | 5/2001 | Jones |
| 6,547,423 B2 | | 4/2003 | Marshall et al. |
| 6,632,006 B1 | | 10/2003 | Rippel et al. |
| 6,994,456 B1 | | 2/2006 | Russo et al. |
| 6,994,457 B2 | | 2/2006 | Lee |
| 7,125,135 B2 | | 10/2006 | Ward |
| 7,163,329 B2 | | 1/2007 | Bina et al. |
| 7,563,004 B2 | | 7/2009 | Pickard et al. |
| 7,789,522 B2 | | 9/2010 | Steadman |

(Continued)

FOREIGN PATENT DOCUMENTS

| | | | |
|---|---|---|---|
| DE | 3737324 | * | 5/1989 |
| EP | 2138874 | * | 12/2009 |

OTHER PUBLICATIONS

DL5ZP Recessed LED Downlight, Lucifer Lighting Company, 2011.
NanoLED Wall Wash Trim Round LN10RWT, USAI Lighting, 2010.

*Primary Examiner* — Peggy Neils
(74) *Attorney, Agent, or Firm* — Mark S. Bicks; Alfred N. Goodman (57) ABSTRACT

A wall wash lighting fixture includes a light source, a light pipe below the light source and a reflector offset from and surrounding the lower end of the light pipe. The lower end of the light pipe has an oblique, light-emitting face that provides uniform wall illumination up to a high vertical angle. The reflector faces substantially away from the wall and provides room-side illumination below about 45 vertical degrees. A preferred embodiment is suited for retrofit recessed installation, especially where small-aperture downlights are desired.

30 Claims, 9 Drawing Sheets

(56) References Cited

U.S. PATENT DOCUMENTS 8,132,944 B2 3/2012 Ruud et al.
8,287,142 B2 10/2012 Pickard et al.
2006/0002136 A1* 1/2006 Buelow et al. ............... 362/581
2007/0258233 A1 11/2007 Gray
2008/0192458 A1* 8/2008 Li ................................. 362/84
2013/0241435 A1* 9/2013 Lamvik et al. ............... 315/291

* cited by examiner

CANDELA/SQ. METER DISTRIBUTION

| Angle in Vertical | WALL SIDE<br>0 DEG | @FIXTURE<br>90 DEG | ROOM SIDE<br>180 DEG |
|---|---|---|---|
| 45° | 199483 | 153449 | 3487 |
| 55° | 181433 | 73949 | 0 |
| 65° | 130706 | 23340 | 0 |
| 75° | 81940 | 0 | 0 |
| 85° | 0 | 0 | 0 |

FIG. 15

FOOTCANDLE DISTRIBUTION ON WALL SURFACE
(fixture 2ft. from wall)

| DISTANCE FROM CEILING IN FEET | ▼ | ▼ | ▼ | ▼ | ▼ | ▼ | ▼ | ▼ | ▼ | ▼ | ▼ |
|---|---|---|---|---|---|---|---|---|---|---|---|
| .5 | 12 | 9 | 5 | 2 | 1 | 14 | 13 | 14 | 13 | 9 | 13 |
| 1 | 14 | 11 | 6 | 3 | 1 | 18 | 17 | 18 | 16 | 12 | 16 |
| 2 | 17 | 13 | 8 | 4 | 2 | 24 | 23 | 24 | 20 | 17 | 20 |
| 3 | 15 | 13 | 9 | 5 | 2 | 24 | 22 | 24 | 19 | 17 | 19 |
| 4 | 10 | 9 | 6 | 4 | 3 | 18 | 17 | 18 | 15 | 13 | 15 |
| 5 | 6 | 5 | 4 | 3 | 2 | 12 | 12 | 12 | 10 | 10 | 10 |
| 6 | 4 | 4 | 3 | 3 | 2 | 9 | 9 | 9 | 8 | 7 | 8 |
| 7 | 3 | 3 | 2 | 2 | 2 | 7 | 6 | 7 | 6 | 6 | 6 |
| 8 | 2 | 2 | 2 | 2 | 1 | 5 | 5 | 5 | 4 | 4 | 4 |
| 9 | 2 | 1 | 1 | 1 | 1 | 4 | 4 | 4 | 3 | 3 | 3 |

FIG. 16

SMALL APERTURE RECESSED WALL WASH DOWNLIGHT

FIELD OF THE INVENTION

The invention relates to lighting fixtures, in particular, to "wall wash" downlights adapted primarily to illuminate a nearby wall.

BACKGROUND OF THE INVENTION

Wall wash downlights typically are recessed in a ceiling near a wall to be illuminated and usually illuminate nearby areas of the room in which they are installed. Many traditional wall wash downlight designs rely on tilting the light source toward the wall and/or employ a "kicker" within the lower portion of the reflector (see, e.g., U.S. Pat. No. 7,125,135 to Ward). Others combine reflectors with broad lenses (see, e.g., U.S. Pat. No. 6,994,456 to Russo, et al). These traditional approaches usually are not workable in the cramped interiors of increasingly popular small aperture (about 2¼ in. diameter) downlights, which often are designed to be installed and/or accessible from below the ceiling.

SUMMARY OF THE INVENTION

The lighting fixture of the invention is a compactly configured wall wash arrangement that maximizes wall illuminance (particularly at high vertical angles) and wall illumination uniformity and minimizes room-side glare, making it well suited for applications that specify small aperture downlights.

One aspect of the invention concerns a wall wash lighting fixture for installation near a wall, the fixture comprising a light source, a light pipe below the light source and a reflector at least partially surrounding the lower end of the light pipe. The light pipe comprises a light-receiving upper end adjacent the light source and a lower end having a slanted, light-emitting face, which obliquely faces the wall with its high point closer to the wall than its low point. The reflector faces substantially away from the wall to redirect a portion of the light emitted by the slanted face of the light pipe away from the wall, toward the room side of the fixture.

The reflector preferably is configured and positioned such that substantially all of the light it redirects toward the room side emerges from the fixture below about 45° from the vertical. The light pipe preferably has the form of a circular cylinder, the slanted light-emitting face being oval in shape and having light-refracting elements that comprise a lenticular array of 90° prisms. Preferably, an internally reflective shield surrounds the light pipe to direct inwardly any light that may escape from the light pipe before reaching its slanted face.

Another aspect of the invention concerns the juxtaposition of parts that comprise a wall wash lighting fixture of the aforementioned type, which also comprises a housing in which the light source, the light pipe and the reflector are situated. The housing has a central longitudinal housing axis; the light source has a central longitudinal light source axis; the light pipe has a central longitudinal light pipe axis; and the reflector has a central longitudinal reflector axis. All four of the axes are substantially parallel; the housing axis and the reflector axis are substantially coaxial; and the light source axis and the light pipe axis are substantially coaxial and offset from the housing axis and the reflector axis.

BRIEF DESCRIPTION OF THE DRAWING

A preferred embodiment of the disclosed invention, including the best mode for carrying out the invention, is described in detail below, purely by way of example, with reference to the accompanying drawing, in which.

DETAILED DESCRIPTION OF THE INVENTION

Figure 1:
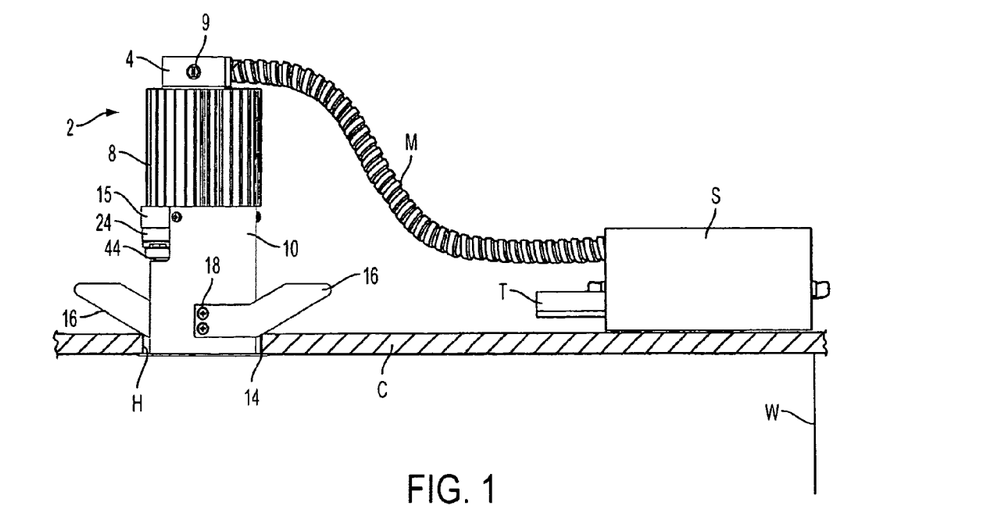
FIG. 1 is a side elevational view of the wall wash lighting fixture of the invention installed with a power supply above a ceiling.
Figure 2:
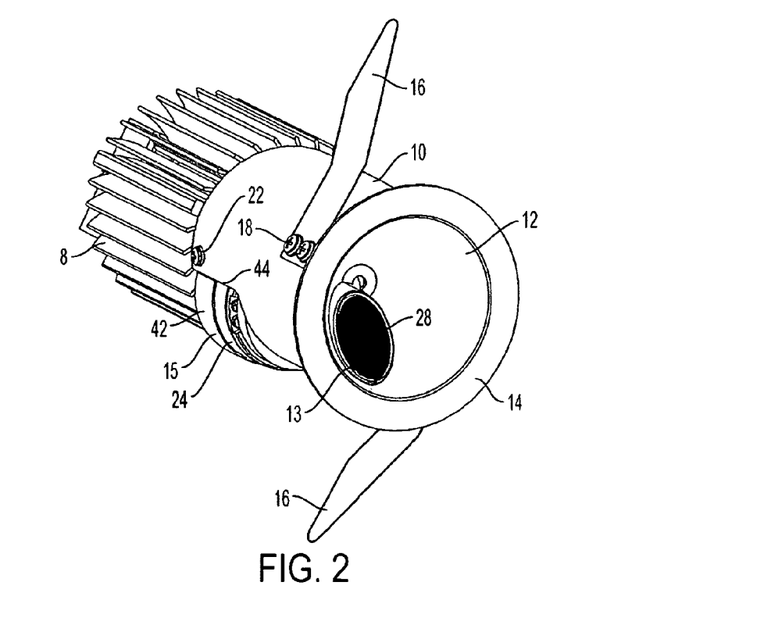
FIG. 2 is a bottom perspective view of the wall wash lighting fixture per se of FIG. 1.
Figure 3:
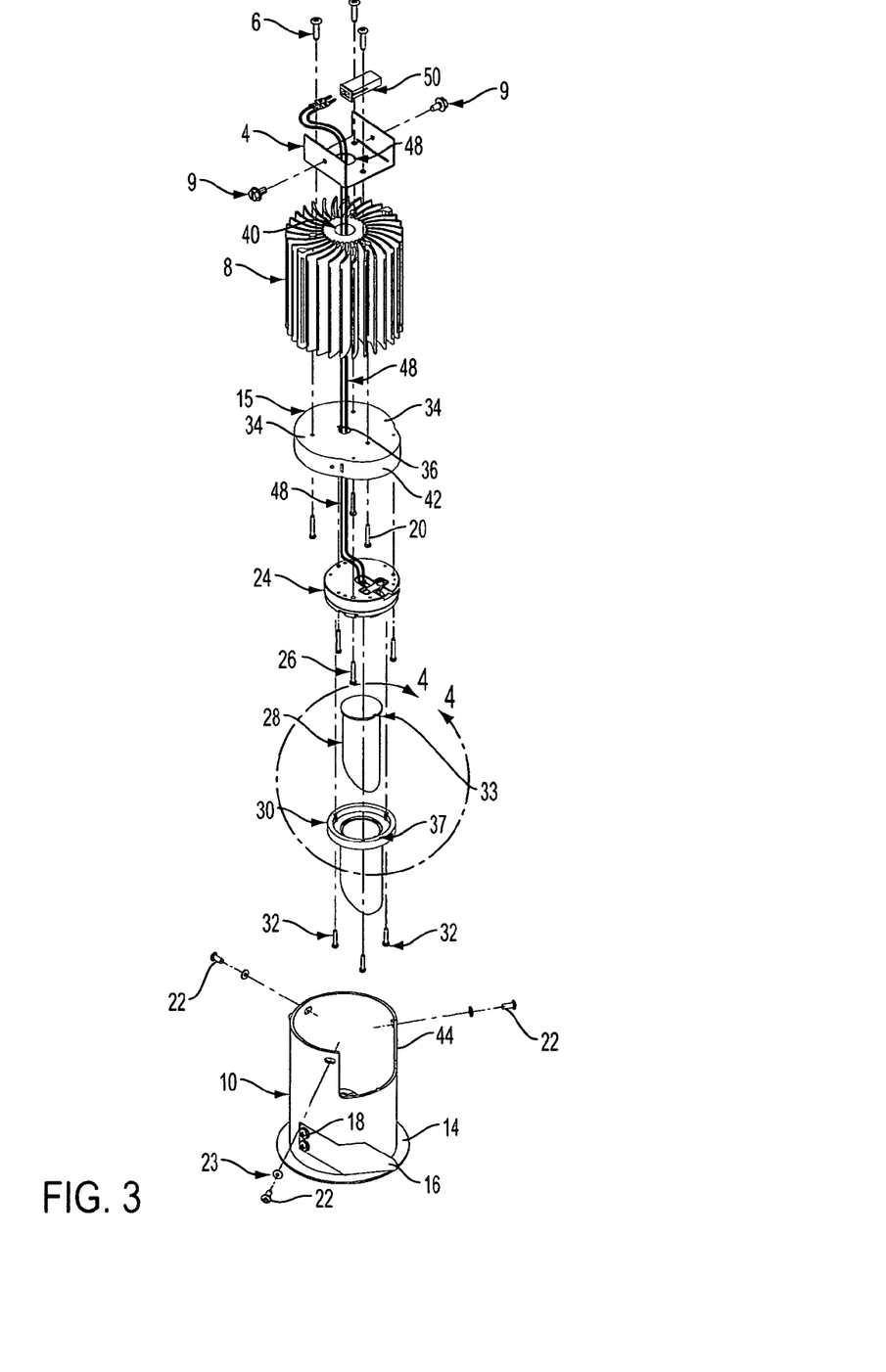
FIG. 3 is an exploded perspective view of the wall wash lighting fixture of FIG. 1.
Figure 4:
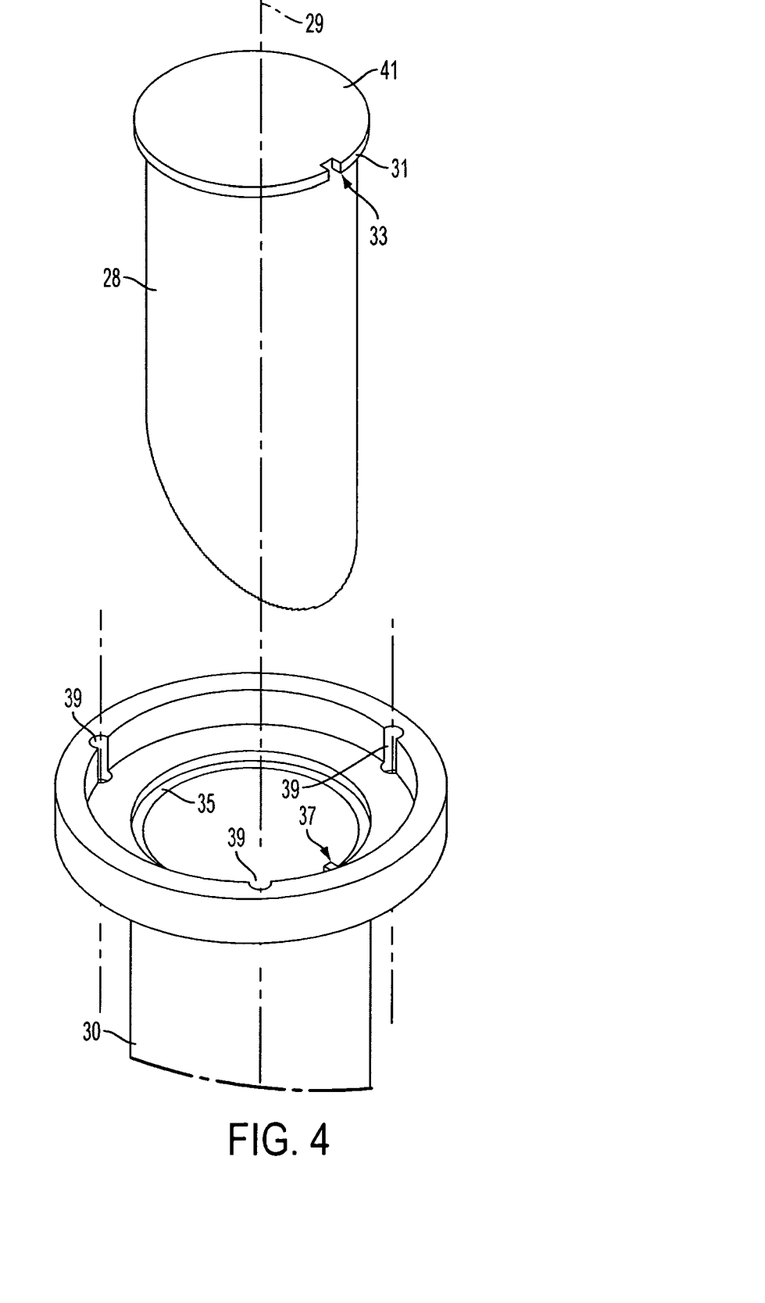
FIG. 4 is an exploded perspective view of the light pipe and shield components of the wall wash lighting fixture of FIG. 1, as delineated by line 4-4 in FIG. 3.

Referring to FIGS. 1-3, a wall wash lighting fixture 2 according to the invention is designed to be installed in and above a ceiling C near a wall W to be illuminated. A supply box S feeds electrical power to the fixture via wiring in a flexible metal conduit M coupled to a junction box 4. In a preferred embodiment, supply box S houses a step-down transformer or electronic LED driver/power supply (not shown) and supports a thermal protector T. Three screws 6 attach junction box 4 to the top of the fixture's finned aluminum heat sink 8. Two screws 9 secure the cover of junction box 4 in place. Junction box 4 and supply box S preferably are mechanically connected by a flexible metallic tether (not shown) that runs through conduit M and functions as a strain relief as well as a grounding cable. Such a tether and suitable alternatives are disclosed in commonly owned U.S. patent application Ser. No. 13/466,533, filed May 8, 2012, which is incorporated herein in its entirety.

A tubular aluminum housing 10 below heat sink 8 is coaxial with the heat sink and with a preferably aluminum reflector 12, which has an offset cutout 13 and an exposed bottom annular trim flange 14. Reflector 12 is bonded to housing 10, preferably by silicone adhesive. Heat sink 8 and housing 10 are rigidly interconnected by a spacer 15, which is described in detail below. Two flat, oppositely directed retention springs 16 are secured tangentially to housing 10 by screws 18. Retention springs 16 removably secure housing 10

(and hence the entire fixture) in a properly sized installation hole H in ceiling C, with trim flange 14 bearing against the lower surface of the ceiling.

Installation of the lighting fixture is straightforward. Supply wiring above the ceiling is pulled through the fixture installation hole H and connected to the fixture wiring in supply box S, which is then passed upward through the installation hole H followed by flexible conduit M. Supply box S simply rests on the upper surface of the ceiling. With retention springs 16 manually squeezed around housing 10, the fixture is pushed upward into the installation hole until the springs pop out above the ceiling, locking the fixture in place. A slight clockwise twist of the reflector trim flange 14 seats it firmly against the ceiling. The fixture can be removed from the ceiling easily by first twisting the trim flange 14 slightly counterclockwise while applying slight downward pressure. Once the retention springs 16 are accessible, they are squeezed together and the housing 10 is pulled down out of the installation hole, followed by flexible conduit M and supply box S. While described herein as well-suited for a retrofit-type, ceiling-supported installation, the lighting fixture could also be removably mounted on a joist-supported pan or frame above a ceiling.

Figure 5:
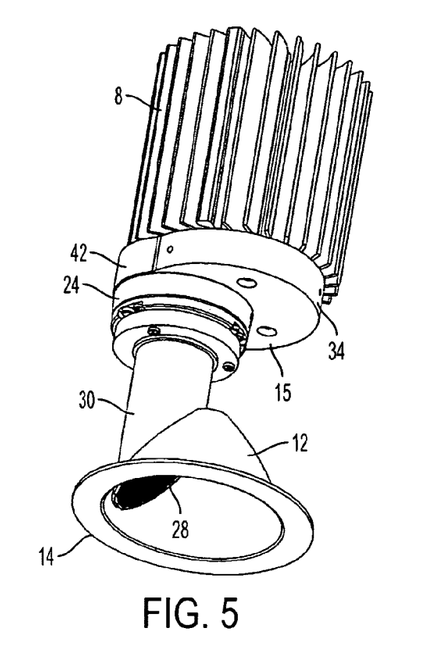
FIG. 5 is a perspective view of the wall wash lighting fixture of FIG. 1, the fixture shown without its housing to reveal otherwise hidden details.
Figure 6:
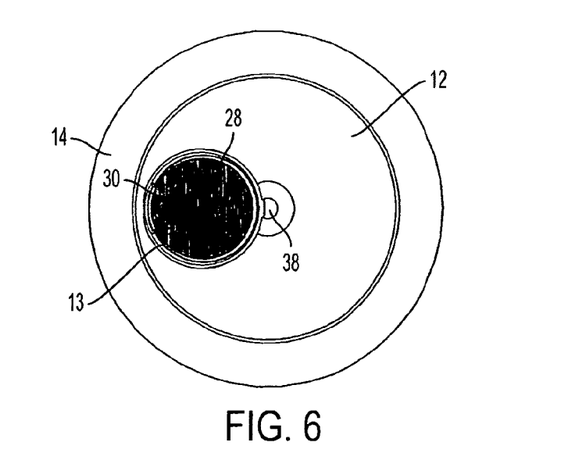
FIG. 6 is a bottom plan view thereof.
Figure 7:
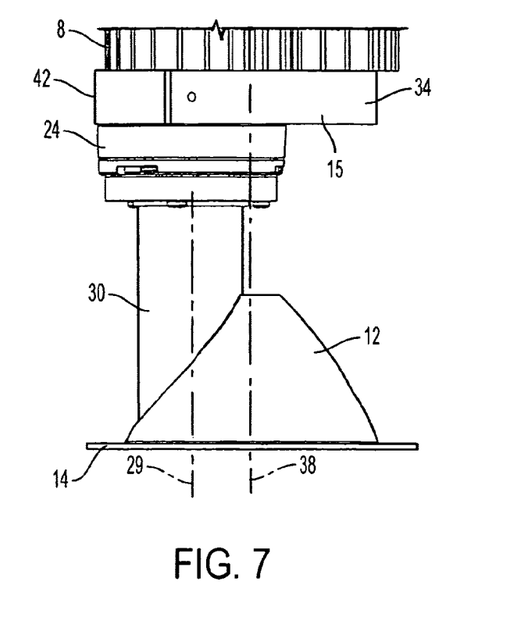
FIG. 7 is a partial side elevational view thereof.
Figure 8:
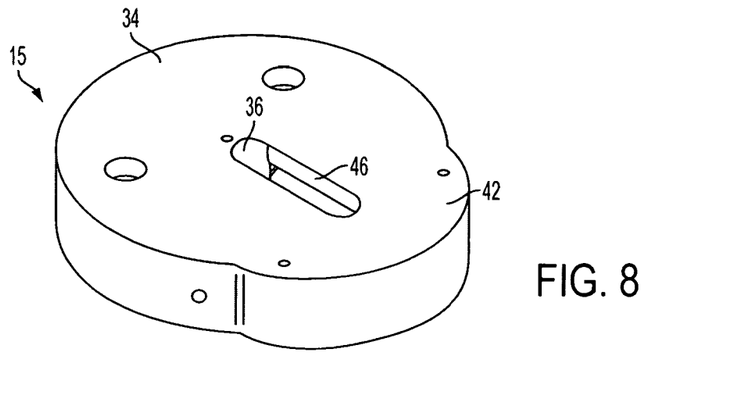
FIG. 8 is a bottom perspective view of a spacer component of the wall wash lighting fixture of FIG. 1.
Figure 9:
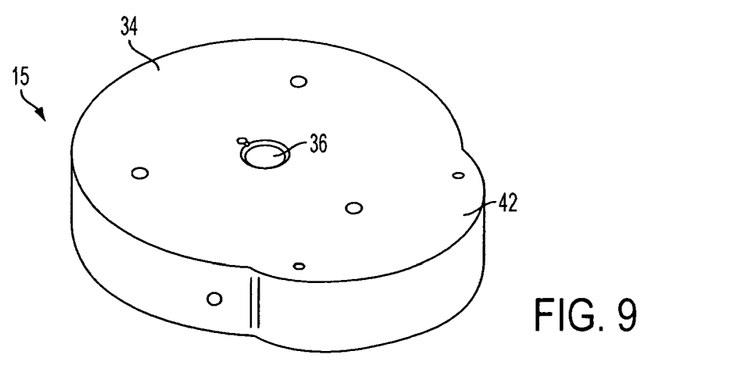
FIG. 9 is a top perspective view thereof.
Figure 10:
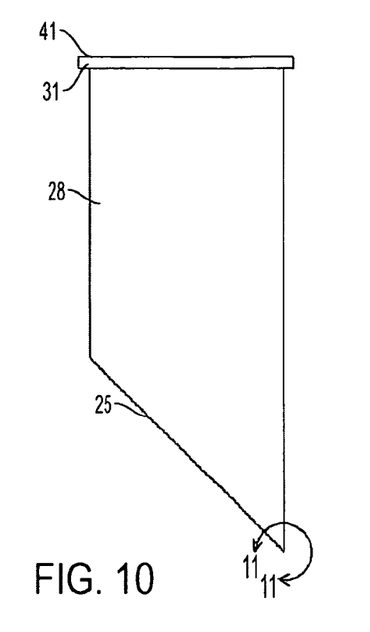
FIG. 10 is a side elevational view of the light pipe component of the wall wash lighting fixture of FIG. 1.
Figure 11:
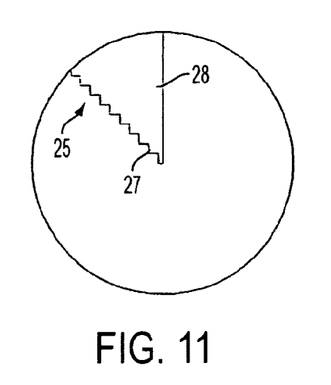
FIG. 11 is a detail view thereof, taken along line 11-11 in FIG. 10.
Figure 12:
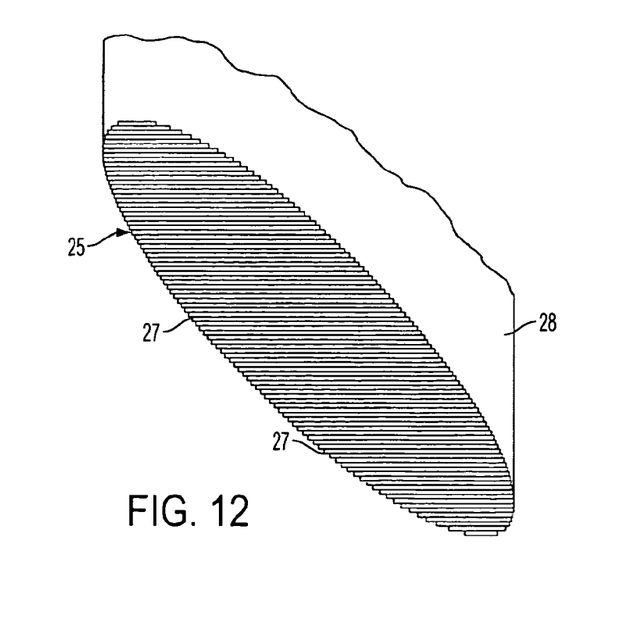
FIG. 12 is a partial bottom perspective view thereof.

Referring to FIGS. 3 and 5, spacer 15 is secured to the bottom of heat sink 8 by three screws 20, while housing 10 is secured to the periphery of spacer 15 by three screws 22 and washers 23. A lamp assembly 24 is mounted to the bottom of spacer 15 by three screws 26 so as to be disposed within housing 10 when the housing is joined to the spacer. Heat generated by the lamp assembly is conducted upward through spacer 15 and is dissipated by finned heat sink 8. As used herein, "lamp assembly" means a light source of any type powered by electricity, such as an incandescent lamp (e.g., tungsten filament or halogen), a compact fluorescent lamp, an LED light engine, etc. In the illustrated preferred embodiment, the lamp assembly is an LED light engine, such as a high output XSM LED module manufactured by Xicato (http://www.xicato.com/products.php).

As seen in FIGS. 3, 5, 7, 8 and 9, spacer 15 has flat upper and lower surfaces, a part-cylinder major portion 34, and a part-cylinder minor portion 42 that protrudes from the major portion and into a notch 44 in housing 10. Major portion 34 has a through-hole 36 at its center, which is aligned with the fixture centerline 38 and with a central bore 40 through heat sink 8. The periphery of major portion 34 thus conforms to the curved outer profile of heat sink 8 and to the curvature of coaxial housing 10. The minor portion 42 has a smaller radius than major portion 34 and a center offset from the fixture centerline 38, which is at through-hole 36. Lamp assembly 24 is mounted to the underside of minor portion 42, substantially coaxial therewith. The underside of spacer 15 (see FIG. 8) has a channel 46 that extends from through-hole 36 approximately to the center of minor portion 42 so as to accommodate conductors 48 (see FIG. 3) that extend from lamp assembly 24, through spacer 15 and heat sink 8, and into junction box 4, where they terminate in a plug-type connector 50. The plug-type connector facilitates removal and replacement of the lamp assembly. Alternatively, twist-on connectors can be used in junction box 4.

Referring to FIGS. 3-7, a light collector in the form of a cylindrical, solid acrylic light pipe 28 is secured to the bottom of lamp assembly 24 preferably by means of a closely surrounding shield 30 (preferably made of aluminum) and three screws 32. Light pipe 28 has a central light pipe axis 29 aligned with the central axis of lamp assembly 24 and parallel to but offset from fixture centerline 38. Light generated by lamp assembly 24 is transmitted down through light pipe 28 to its lower end, which has a slanted light-emitting bottom face 25 (described below). The open lower end of shield 30 is substantially parallel to bottom face 25. An integral retaining flange 31 at the upper end of light pipe 28 has a peripheral indexing notch 33. The wider upper end of shield 30 has an annular seat 35 that accommodates retaining flange 31 of light pipe 28. The correct angular position of light pipe 28 is ensured by a projecting rib or key 37 in seat 35 that mates with the light pipe's indexing notch 33. An alternative embodiment would comprise a projecting rib or key on light pipe 28 that mates with an indexing notch in shield 30. Other suitable indexing arrangements can be used to properly orient light pipe 28 relative to shield 30. Mounting screws 32 pass through holes and aligned grooves 39 in the upper end of shield 30. When the fixture is fully assembled, light pipe 28 and shield 30 extend slightly into reflector 12 through closely surrounding cutout 13. When the fixture is installed, light pipe axis 29 and fixture centerline 38 are substantially vertical. Instead of being held in place by shield 30, light pipe 28 could be secured by adhesive or other suitable means directly to the bottom of lamp assembly 24, in which case shield 30 could be attached to reflector 12 (e.g., by adhesive) or eliminated.

In the preferred embodiment, the lighting fixture has a two-inch nominal aperture. Light pipe axis 29 is offset from the axis of reflector 12, which is coincident with the fixture centerline 38. In the preferred embodiment, the offset is 0.57 in. The LED light engine 24 emits a solid, substantially uniform hemisphere of light from a planar disk having a diameter of 0.870 in. Light pipe 28 has an acrylic index of refraction of about 1.490. Referring to FIGS. 10-13, the light pipe's diameter across its circular retaining flange 31 is 0.960 in. and its flat upper face 41 maximizes light transmission normally through that surface into the light pipe. The major portion of light pipe 28 (below retaining flange 31) has a diameter of 0.860 in. and a length to its lowest point of 2.145 in. (about 2.5 times its width). The curved surface of light pipe 28, which has a highly specular polish, provides high internal reflectivity to minimize lateral light loss. Shield 30 preferably is painted white on the inside to make it highly reflective and diffusive, thus preventing leakage of any stray light by absorbing and/or redirecting it back into the light pipe.

Figure 13:
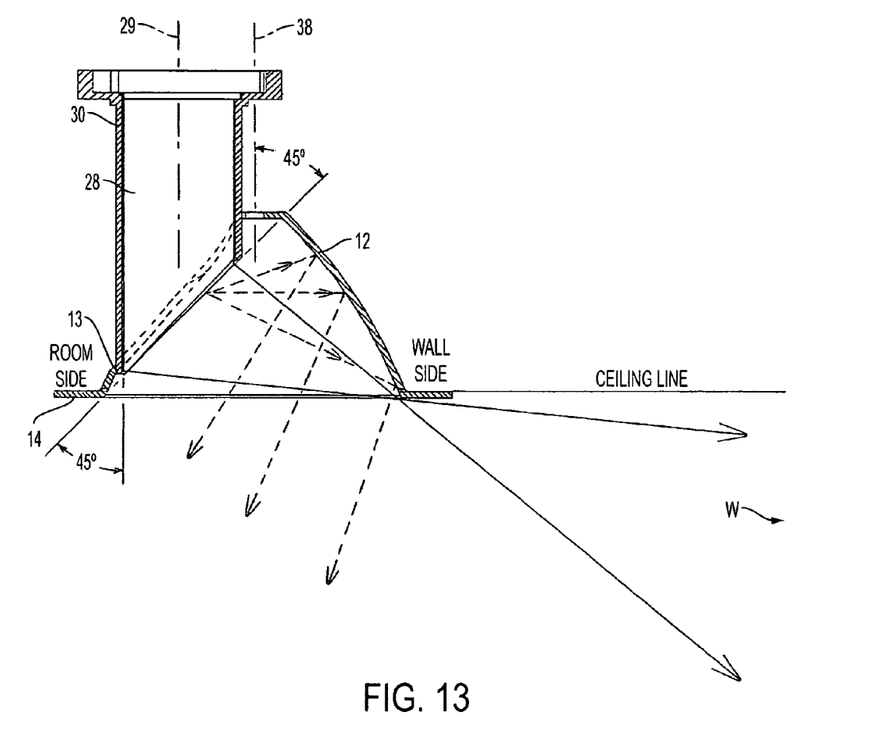
FIG. 13 is a schematic ray trace diagram of the wall wash lighting fixture of FIG. 1, based on a longitudinal sectional view through the reflector and the shield components (but not through the light pipe)

The light pipe's bottom face 25 redirects light transmitted through the light pipe to illuminate a nearby wall uniformly. Bottom face 25 is slanted at 45° to the light pipe's upper face 41 and to its axis 29. As shown in FIG. 13, the fixture is installed in a ceiling with bottom face 25 directly facing the nearby wall W with its high point closer to the wall than its low point. Bottom face 25 has an elliptical profile and preferably is configured as a lenticular lens (75 lenses per inch) of uniform, horizontal, 90° prisms 27 (see FIGS. 11 and 12) each having a height of 0.0094 in. and a depth of 0.0094 in.

Bottom face 25 may be configured differently to achieve different illumination patterns. For example, bottom face 25 may be flat and smooth; or it may have a different lenticular configuration, a concave feature, a convex feature or a diffusing element. The light pipe's upper face 41 also may be configured differently to shape the illumination pattern entering the light pipe by providing, for example, a concave feature for focusing the light or a diffuser for spreading the light.

Reflector 12, which preferably has a specular inner surface, has a 2.31 in. diameter aperture and is 1.44 in. tall. The reflected ray traces in FIG. 13 (indicated by the dashed arrow lines) show that light cannot exit the fixture above about 45 vertical degrees toward the room side, thus making reflector 12 optically passive, i.e., substantially glare-free above 45 degrees. The edge of the reflector cutout 13 also is optically passive as it is not possible for it to reflect light from the light source toward the other fixture components or nearby walls. This restriction on room-side illumination is afforded by the contour of reflector 12, its horizontally offset location relative to light pipe 28 and the oblique orientation and vertical placement of light-emitting bottom face 25. The lowest edge of light pipe 28 can be as low as 0.17 in. above the bottom surface of reflector 12 without creating glare toward the room side; and the lowest edge of shield 30 can be as low as 0.18 in. above the reflector's bottom surface without creating glare toward the room side.

The two solid-line ray traces in FIG. 13 represent direct illumination emanating from bottom face 25 toward the wall side of the fixture. The upper ray trace shows that the offset location and vertical placement of the light-emitting bottom face 25 allow light to exit the fixture at a high vertical angle toward the wall side. The vertical light spread toward the wall side is from zero to as high as about 83 vertical degrees.

Figure 14:
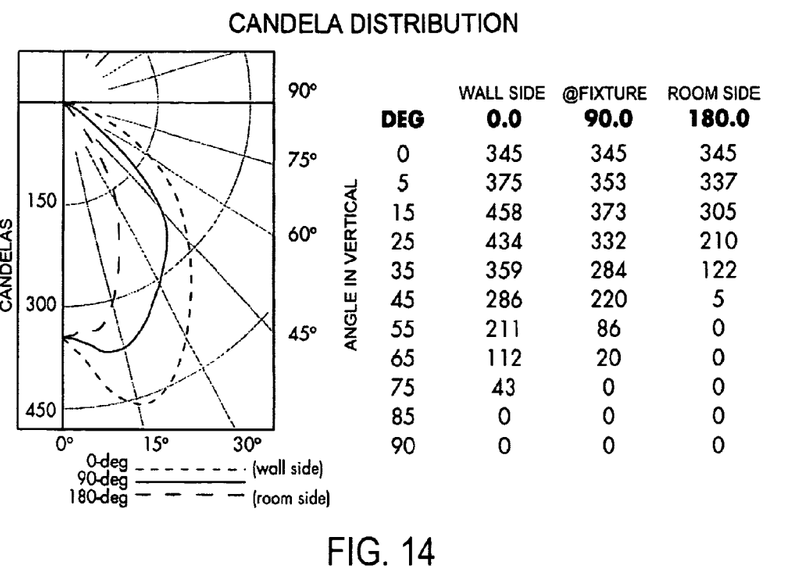
FIG. 14 consists of a candela distribution graph and a table of intensity as a function of angle of the wall wash lighting fixture of FIG. 1.
Figure 15:
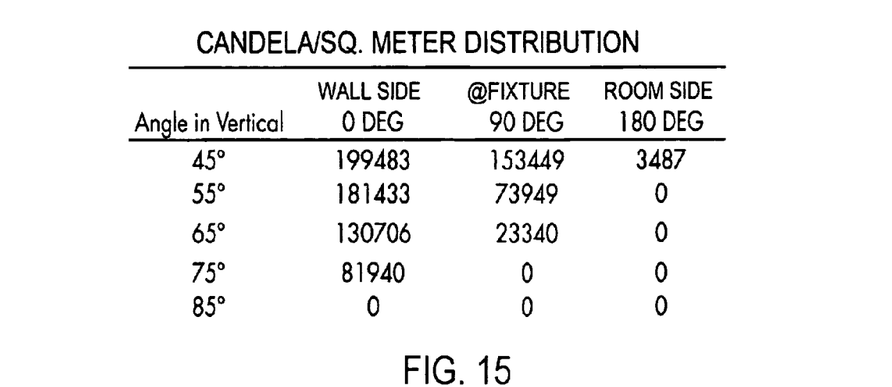
FIG. 15 is a table of luminance as a function of angle thereof.
Figure 16:
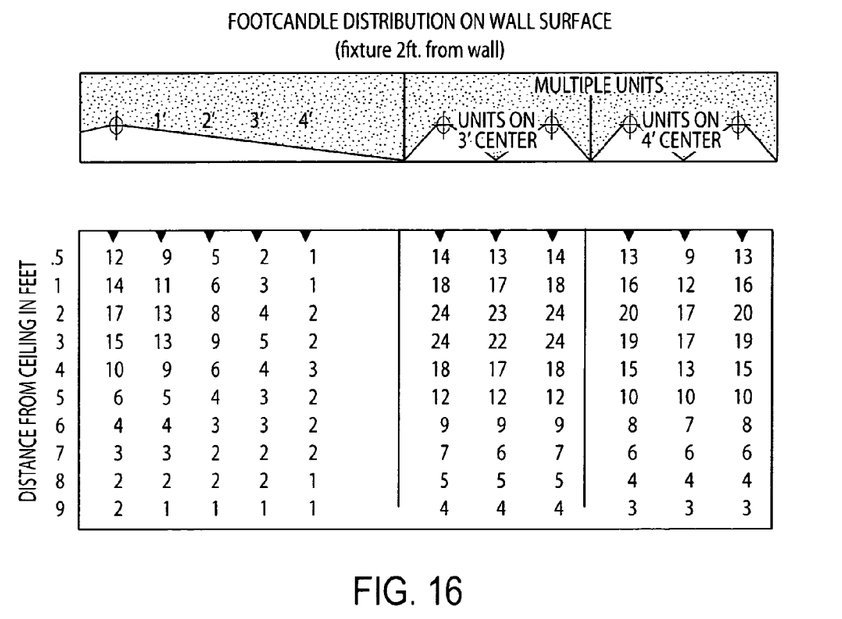
FIG. 16 is a table of wall illuminance distribution thereof in footcandles.

FIGS. 14-16 show photometric data generated from photometrically testing a lighting fixture constructed in accordance with the above-described preferred embodiment of the invention, having the following parameters:

LED Light Engine: 3,000K, 80 CRI
System Wattage: 20 W
Fixture Delivered Lumens: 714
Fixture Efficacy: 36 lumens per watt
Tested at 25° C. Ambient in accordance with IESNA LM-79-2008

FIGS. 14 and 15 show intensity and luminance as a function of vertical angle in three horizontal directions: the wall side ("0-deg"), the room side ("180-deg") and in a vertical plane through the fixture parallel to the wall ("90-deg"). The intensity and luminance documented are the sum of light from any surface that is flashing (reflector, shield or lens). These two figures show that at 90° (i.e., parallel to the wall), the light pattern is not as wide as the pattern on the wall side, but not as narrow as the pattern on the room side. They also show that room-side illumination above 45 vertical degrees is nil. FIGS. 14-16 show uniform vertical illumination on the wall side. FIG. 16 shows uniform lateral illumination of a wall located two feet from a row of fixtures placed three feet on center, and fairly uniform lateral illumination even when the fixtures are placed four feet on center. Similar vertical and lateral wall illumination uniformity occurs when the fixtures are located three feet from a wall.

While a preferred embodiment has been chosen to illustrate the invention, it will be understood by those skilled in the art that various changes and modifications may be made without departing from the scope of the invention as defined by the appended claims. While the preferred embodiment has been described as adapted for recessed mounting in and above a ceiling, it will be appreciated that the features of the invention can also be incorporated in a lighting fixture adapted for exposed surface mounting directly to the underside of a ceiling or other exposed surface, or as a track head fixture, or as a pendent fixture.

What is claimed is:

1. A wall wash lighting fixture for installation near a wall, comprising:
 a light source;
 a light pipe below the light source, the light pipe comprising a light-receiving upper end adjacent the light source and a lower end having a slanted light-emitting face with a high point and a low point, the slanted face obliquely facing the wall with said high point closer to the wall than said low point when the lighting fixture is installed; and
 a reflector at least partially surrounding the lower end of the light pipe from said high point downward toward said low point, the reflector facing substantially away from the wall when the lighting fixture is installed to redirect a portion of the light emitted by the slanted face of the light pipe away from the wall.

2. The wall wash lighting fixture of claim 1, wherein said slanted face is oval.

3. The wall wash lighting fixture of claim 2, wherein the light pipe comprises a circular cylinder.

4. The wall wash lighting fixture of claim 3, wherein said upper end is substantially circular.

5. The wall wash lighting fixture of claim 3, wherein said slanted face is disposed at an angle of about 45° to a central longitudinal axis of the light pipe.

6. The wall wash lighting fixture of claim 1, wherein the overall length of the light pipe is about 2.5 times its average width.

7. The wall wash lighting fixture of claim 1, wherein said slanted face comprises a plurality of light-refracting elements.

8. The wall wash lighting fixture of claim 7, wherein said slanted face comprises a lenticular array.

9. The wall wash lighting fixture of claim 8, wherein the lenticular array comprises 90° prisms.

10. The wall wash lighting fixture of claim 9, wherein the lenticular array comprises about 75 prisms per inch.

11. The wall wash lighting fixture of claim 1, wherein said slanted face is configured and positioned to emit light toward the wall up to about 83° from the vertical.

12. The wall wash lighting fixture of claim 1, further comprising a shield surrounding the light pipe for substantially preventing lateral leakage of light from the fixture.

13. The wall wash lighting fixture of claim 12, wherein the shield comprises a reflective inner surface for inwardly directing light that escapes from the light pipe before reaching said slanted face.

14. The wall wash lighting fixture of claim 1, wherein the reflector comprises an arcuate reflective surface.

15. The wall wash lighting fixture of claim 14, wherein the reflector completely surrounds the lower end of the light pipe.

16. The wall wash lighting fixture of claim 14, wherein the reflector is configured and positioned such that substantially all of the light it redirects emerges from the fixture below about 45° from the vertical.

17. A wall wash lighting fixture for installation in a ceiling near a wall, comprising:
 a housing having a central longitudinal housing axis;
 a light source within the housing having a central longitudinal light source axis substantially parallel to and offset from said housing axis;
 a light pipe within the housing and below the light source, the light pipe having a central longitudinal light pipe axis substantially coaxial with said light source axis and comprising a light-receiving upper end adjacent the light source and a lower end having a slanted light-emitting face obliquely facing the wall when the lighting fixture is installed; and
 a reflector within the housing at least partially surrounding the lower end of the light pipe and facing substantially away from the wall when the lighting fixture is installed to redirect a portion of the light emitted by the slanted face of the light pipe away from the wall, the reflector having a central longitudinal reflector axis substantially coaxial with said housing axis.

18. The wall wash lighting fixture of claim 17, wherein said slanted face is oval.

19. The wall wash lighting fixture of claim 18, wherein the light pipe comprises a circular cylinder.

20. The wall wash lighting fixture of claim 17, wherein said slanted face is disposed at an angle of about 45° to a central longitudinal axis of the light pipe.

21. The wall wash lighting fixture of claim 17, wherein the overall length of the light pipe is about 2.5 times its average width.

22. The wall wash lighting fixture of claim 17, wherein said slanted face comprises a plurality of light-refracting elements.

23. The wall wash lighting fixture of claim 22, wherein said slanted face comprises a lenticular array.

24. The wall wash lighting fixture of claim 23, wherein the lenticular array comprises 90° prisms.

25. The wall wash lighting fixture of claim 24, wherein the lenticular array comprises about 75 prisms per inch.

26. The wall wash lighting fixture of claim 17, wherein said slanted face is configured and positioned to emit light toward the wall up to about 83° from the vertical.

27. The wall wash lighting fixture of claim 17, further comprising a shield surrounding the light pipe for substantially preventing lateral leakage of light from the fixture.

28. The wall wash lighting fixture of claim 17, wherein the reflector comprises an arcuate reflective surface.

29. The wall wash lighting fixture of claim 28, wherein the reflector completely surrounds the lower end of the light pipe.

30. The wall wash lighting fixture of claim 28, wherein the reflector is configured and positioned such that substantially all of the light it redirects emerges from the fixture below about 45° from the vertical.

* * * * *